July 27, 1965  J. H. BERTIN ET AL  3,196,822
DEVICE FOR PERMITTING DECK LANDINGS ON AN AIRCRAFT-CARRIER
IN MISTY OR FOGGY WEATHER
Filed May 21, 1963  2 Sheets-Sheet 1
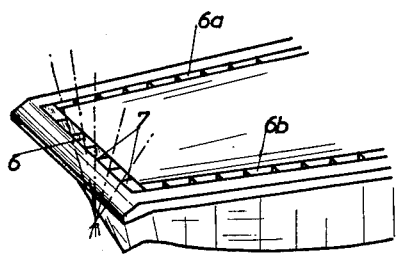
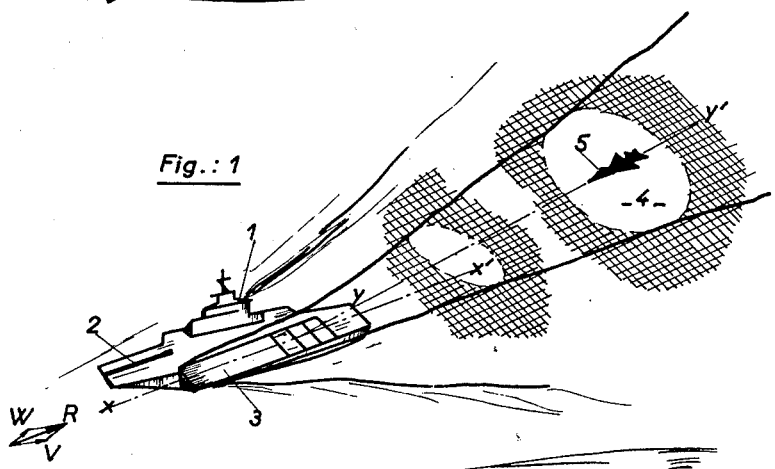
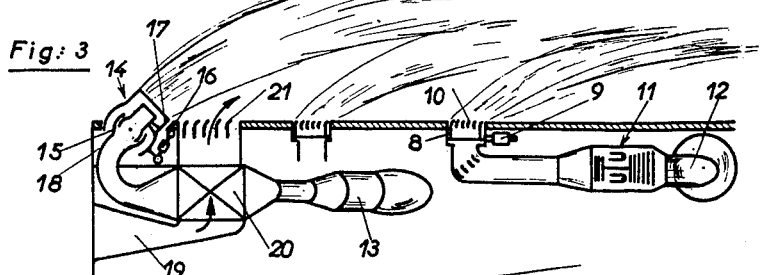
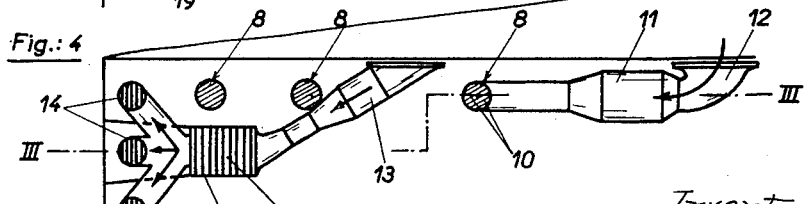
Inventors
Jean Henri Bertin
Ernest Dubois
By Stevens, Davis, Miller & Mosher
Attorneys

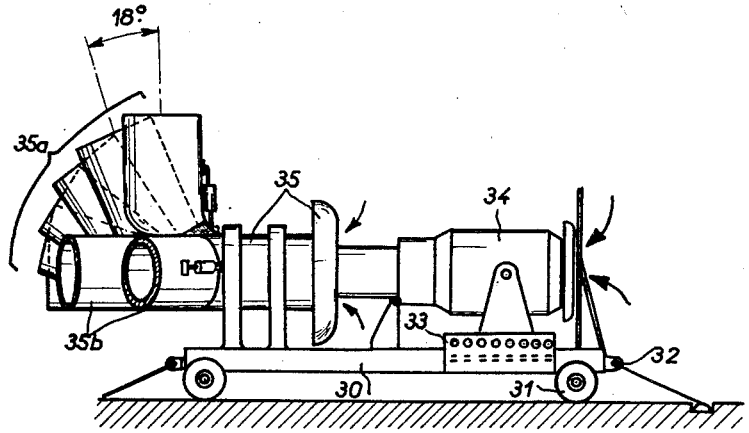
Fig.:5
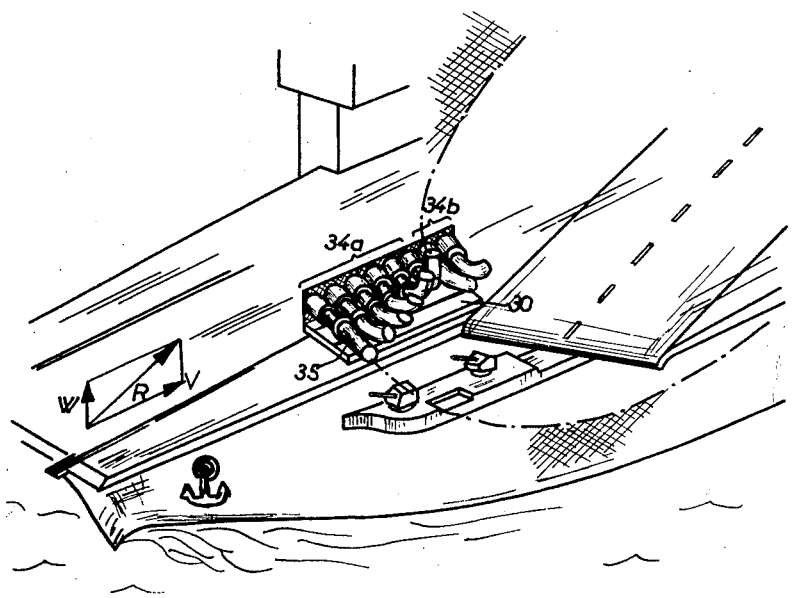
Fig.:6

United States Patent Office 3,196,822
Patented July 27, 1965

3,196,822
DEVICE FOR PERMITTING DECK LANDINGS ON AN AIRCRAFT-CARRIER IN MISTY OR FOGGY WEATHER
Jean Henri Bertin, Neuilly-sur-Seine, and Ernest Dubois, Fontenay-aux-Roses, France, assignors to Societe Bertin & Cie, Paris, France, a company of France
Filed May 21, 1963, Ser. No. 281,901
Claims priority, application France, May 24, 1962, 898,628
4 Claims. (Cl. 114—43.5)

Deck landings by aircraft on an aircraft-carrier are virtually impossible in poor visibility. This handicap reduces the effectiveness of this weapon system when the ship meets with sea mist or fog, a phenomenon that is particularly frequent in certain sea zones and at certain times of the day.

In order to facilitate deck landings by homing aircraft, the aircraft-carrier usually steams at maximum possible speed, in the same direction as the aircraft and substantially into the wind, to ensure that the latter blows along the axis of the landing deck even when the same is slightly angled relative to the ship's fore-aft axis. Approach conditions for the aircraft, from the points of view of both handling and length of the deck run, are thus markedly improved.

As a result, the approach and the deck landing are made in a direction rigorously opposite to a general high-speed airstream, the velocity of the wind in misty or foggy weather being by no means negligible and being added vectorially to the ship's forward speed. It is important to note this absence of crosswinds during the approach and deck landing phases.

The present invention has for its object to provide for the discharge, at the bows of an aircraft-carrier and adjacent the forward extremity of the landing deck, of a large volume of gas hotter than the ambient air, in such manner that the turbulent diffusion of the hot gas into the ambient air, the natural ascent of the now transparent mixture, and the motion of the ship should jointly produce an elongated volume of sufficient dimensions to permit an aircraft to make its final approach by direct visibility even in foggy weather.

More specifically, this invention has for its object to generate, at the bows of an aircraft-carrier and as simply and economically as possible, a large volume of gas the temperature of which is higher by a few degrees only than that of the ambient air, in order that the velocity of ascent of the air, which air is made transparent by mixing with the hot gas, and the forward speed of the ship should combine vectorially to produce a cleared volume the general direction of which has a mean slope compatible with a final aircraft approach by direct visibility.

The thermal generators utilized for the purpose are preferably turbojets of a type too obsolete for aircraft propulsion but the mechanical condition of which is adequate for the application envisaged, which application can be likened to certain industrial applications in the thermal field. Such turbojets are preferably combined with an ejector-nozzle in which the hot gas sustains an initial dilution with the ambient air.

In accordance with a first embodiment, the installation is of the fixed type, being disposed beneath the flight deck of an aircraft-carrier. The jet-pipe of each turbojet is connected through a large-diameter duct to at least one discharge outlet which is preferably orientable and projects only slightly above the flight deck of the aircraft-carrier.

Orientability of the discharge outlet permits of modifying the vertical and lateral components of the velocity of the hot stream emitted, and accessorily also its longitudinal component which can make an optional contribution to propulsion, braking and even steering of the ship.

The disposition of the several outlets can vary considerably, but other outlets spaced farther apart and disposed on either side of the deck are generally associated to a row of discharge outlets arranged at the forward end of the flight deck. In addition, complementary outlets for supplying the wake of the hot air curtain ejected from the bows with ambient air, which is heated slightly by passage through heat exchangers or ejectors that bleed off a small portion of the energy of the primary high-temperature flow generated by the turbojets, can be provided.

Each jet penetrates into the general axial wind airstream at a distance dependent upon its natural characteristics and the characteristics of said general airstream; it dilutes into the ambient air in obedience to well-known laws whereby to produce, subsequent to following a short mixing path, a layer of hot air within which the water droplets contained in the fog and introduced by a turbulent dilution process are vaporized. Visibility becomes clear at all points where the temperature rise exceeds the ambient temperature by a few degrees.

The emission can be made with the aid of separate outlets which, however, can be close to one another and even be jointive and constitute an uninterrupted slit whereby to form a curtain. It is thus possible in all cases to generate, by juxtaposing the unit volumes issuing from each source, a single completely clear elongated volume enveloping both the landing deck and the normal approach path of an aircraft, and extending beyond the flight deck of the aircraft-carrier with a slightly ascending general slope. The interior of this volume, the boundaries of which are constituted by the elemental jet layers, is preferably supplied with complementary air which is heated slightly by conduction or mixing with part of the primary flow, as explained precedingly.

The ascending motion which permits of imparting to said volume the slope required for its axis to be for all practical purposes coincident with the aircraft approach path is due to the Archimedes effect, as applied to masses of heated air in which the temperature rise relative to the ambient air is small once they have lost their absolute velocity relative to the surrounding air through a turbulent dilution process.

In an alternative embodiment, the installation is movable and comprises a battery of thermal generators disposed side by side on a common platform and provided with ejection nozzles which can be orientable if desired. A number of said nozzles are preferably displayed in such manner that the forward motion of the ship should cause the hot gas jets emitted thereby in a transverse layer to sweep a volume of substantial cross-section. Such a movable platform is disposed on the flight deck only in foggy weather, crosswise of the same; it can be provided with wheels to facilitate stowage in fine weather.

For a better understanding of the invention, and to show how the same may be carried into effect, reference will now be made to the accompanying drawings in which:

FIGURE 1 is a schematic perspective view of an aircraft-carrier fitted out in accordance with the invention, showing the cleared volume associated to the ship;

FIGURE 2 is an enlarged perspective view of the bows of an aircraft-carrier equipped with transverse and longitudinal discharge slits;

FIGURES 3 and 4 are respectively side-elevation and plan views in partial section of a fixed hot air discharging device positioned beneath the flight deck of such an aircraft-carrier;

FIGURE 5 is a side-elevation view of a mobile device according to the invention; and FIGURE 6 is a perspective view of a possible form of installation of said device on an aircraft-carrier having an angled flight deck.

Referring first to FIGURE 1, there is shown thereon an aircraft-carrier 1 which is for instance a modern ship equipped with forward catapults 2 and a flight deck 3 which is angled by a few degrees with respect to the fore-aft axis of the ship.

The landing operations can be accomplished with a total relative wind R blowing exactly along the axis of flight deck 3 provided that the velocity V of the water (opposing the forward speed) relative to the ship and the natural wind W combine geometrically in appropriate fashion, as illustrated. Since in practice the axis XX' of flight deck 3 and that of the ship 1 form an angle of less than 10°, a compromise is usually adopted between the optimum conditions applying respectively to deck landings and catapulting.

In accordance with the present invention, deck landings are made feasible in thick fog by the emission, from thermal generators which can be constituted with advantage by turbojets, of hot gases which generate a cleared volume 4 extending almost horizontally above the landing deck before they assume an inclined and ascending general direction YY' after said volume develops above said flight deck axis XX' under the effect of the Archimedes forces and the turbulence. The velocity R of the total relative wind is markedly greater than that of the natural wind W prevailing in foggy weather and suffices to assist adhesion of the cleared volume to the flight deck.

Regulation of the ship's forward speed V permits of controlling velocity R whereby to cause it to so compose geometrically with the ascending velocity of the hot gas in the vertical plane that the axis of the cleared volume YY' is given a slope equal to that of the normal approach path of aircraft preparing to land.

It is likewise possible to operate on the ascending velocity of the heated and cleared air by metering the flow of fuel to the thermal generators and hence regulating the temperature of the hot gas emitted. It would alternatively be possible to provide a reheat process of adequate magnitude in the jet-pipes of the turbojets and even in the ejectors combined therewith.

Thus, a pilot who is brought to the position denoted by reference numeral 5, close to said approach path, by conventional radio aids, will see the ship at the end of a cleared volume that passes through the layer of mist and is shaped substantially as a slightly widening out funnel; in other words, a "glide path" is provided by purely aerodynamic means in the event of misty or foggy weather.

Said means can be likened to those described in two prior patent applications made by the applicant, the first filed in the United States on June 30, 1959 under Serial No. 823,934 and the second filed in the United States on July 30, 1962 under Serial No. 213,384. However, the present means differ therefrom by virtue of their specific adaptation to an aircraft-carrier, and are illustrated in FIGURES 2 through 6.

Indeed, it will be appreciated that the local aerodynamic overspeeds due to the ship's forward speed are necessarily accompanied by a transverse pressure gradient which assists adhesion to the flight deck of the hot gas emitted for constitution of the cleared volume referred to. Turbojets, or the like, utilized for generating such gas can consequently be equipped with a variety of jet-pipes, possibly adapted to further assist said adhesion, without departing from the scope of the invention.

FIGURE 2 shows a continuous discharge nozzle 6, 6a, 6b bordering the flight deck of an aircraft-carrier. Partitions 7 placed in a fore-aft direction to provide partitioning in the forward nozzle 6 can consequently diverge outwardly with respect to the axial plane of the ship's hull, such divergence assisting the transverse spread of the hot-fluid layer at the forward end of the ship.

Reference is next had to FIGURES 3 and 4, which are mutually corresponding side-elevation and plan views and which illustrate adjacent but non-contiguous elemental nozzles which likewise serve to generate a forward fluid-layer and two lateral layers, between which can be admitted a volume of gas heated to a lesser degree.

An elemental nozzle, such as a lateral nozzle 8 orientable by the aid of a motor 9 and conforming to the second patent cited precedingly, i.e. more specifically one equipped with guide vanes 10, can be supplied with hot gas by a turbojet 11 taking in air from the side of the ship through an air duct 12.

A turbojet such as 13 can however supply several nozzles at once, an example being the three designated by reference numeral 14. Said nozzles are preferably orientable and to that end can be mounted on a ball-joint 15 and be operated by actuators such as 16. They preferably include in addition an external diffusing cowl 17 whereby to entrain the ambient air by an ejector effect, such air being drawn in at 18, say, at the forward end of the ship, at dynamic pressure.

In addition, the very hot gases generated by a turbojet such as 13 can be used with advantage to heat by a few degrees a stream of ambient air 19 which is likewise drawn in at the forward end of the ship, thereby taking advantage of the dynamic pressure, and which serves to supply at higher temperature the wake of the forward layer. Airstream 19 can be heated in a heat exchanger 20, but can be heated more simply by a mixing process, utilizing ejectors in substitution for said heat exchanger. It goes without saying that the inlet duct to the heat exchanger could have an increasing cross-section whereby to recover said dynamic pressure, and also that the outlet nozzle 21 into the wake of the forward layer could be orientable.

Thus it will be appreciated that the cleared volume is bounded by a layer of relatively hotter gas (as compared to the surrounding air) than the gas supplying its central area. It will suffice for the temperature of the latter-mentioned gas to exceed the surrounding temperature by a few degrees only for the relative humidity of this gas to drop below saturation point, thereby ensuring complete dissipation of the fog. The cleared volume tends to rise slowly under the effect of the Archimedes forces, and the ratio of the forward speed of the aircraft-carrier to the ascending velocity of the gas can be so chosen that the slope of the axis YY' (or mean direction) of said volume be substantially coincident with a standard aircraft approach path.

FIGURES 5 and 6 illustrate an alternative embodiment of a compact mobile installation adapted to be stowed away in fine weather and to be disposed on the flight deck only in foggy weather.

A platform or chassis 30 possibly supported on wheels 31 and equipped with mooring means 32 groups together a control console 33 and a battery of thermal generators.

Said generators can preferably include obsolete turbojet-engines 34 which are nevertheless in sufficiently good mechanical condition to ensure reliable operation and each of which is associated to an ejector-nozzle 35 adapted to produce a suitable dilution and possibly adjustable deflection of the hot gas emitted. The turbojets are preferably numerous enough (eight on the drawing) and the ejector-nozzles are distributed in two sets, as indicated hereunder:

(1) A large set, associated to the turbojets 34a nearest to the bows of the ship (six on the drawing) and consisting of ejector-nozzles 35a the respective directions of ejection of which are uniformly stepped between the horizontal and vertical positions, whereby to finally discharge an unbroken layer of gas at moderate velocity and temperature.

(2) A smaller set, associated to the turbojets 34b most remote from the bows of the ship (two on the drawing) and consisting of ejector-nozzles 35b directed inwardly into the volume bounded by the layer of hot gas emitted by the first set of ejectors. These latter-mentioned ejectors supply hot air to the volume to be cleared beneath the wind of the layer generated by turbojets 34a. These ejectors can provide a higher coefficient of dilution than the ejectors of the first set and be orientated roughly horizontally in order that the jets of low velocity and moderate temperature they emit should adhere to the surface of the flight deck.

The ejectors 35 or like means can embody a bend of adjustable angle, in any manner well known per se. They can likewise be pivotable about the axis of the associated turbojet 34. Noise suppressors preferably consisting of multiple tubes can furthermore be associated to the turbojets.

In this manner, the landing deck can be covered with an expanding cleared volume into which there is no danger of the fog penetrating anew despite possible atmospheric turbulence. This cleared volume or space has great longitudinal development, its width is greater than that of the flight deck, and its height, which can attain 15 meters at the level of the thermal generators, increases aft by about 20 meters by 100 meters above the deck and ultimately forms a clear wake at least 100 meters in diameter to the stern of the ship. The mean slope of said volume is of the same order of magnitude as that of the customary final approach path followed by aircraft coming in to land, while enabling the pilot to switch easily to visual flying during the ultimate phase of the landing approach, i.e. just before landing on the flight deck.

It goes without saying that, without in any way departing from the scope of the invention, it would be possible to modify the linear or surface area distribution of the nozzles and to use a plurality of mobile platforms whereby to adapt such distribution to the field of aerodynamic velocities associated to the ship's motion. By way of example, auxiliary turbojets could be disposed aft to control the aerodynamic wake of the ship. It should also be noted that the combined thrust of the nozzles is sufficient to possibly assist in maneuvering the aircraft-carrier.

What we claim is:

1. In combination with an aircraft-carrier ship having a landing deck, a device for providing cleared volume of air in foggy weather of appropriate slope in which aircraft visual control can be achieved during final approach and landing on the deck of said ship, said device comprising means for generating by combustion a large volume of hot gas on board of said ship, and means for discharging said hot gas in a continuous transverse layer at the front end of said landing deck with respect to the ship motion, said generating means comprising a plurality of turbojets and ejector nozzles attached to said turbojets to draw in and mix ambient air with hot gas for supplying said cleared volume.

2. A device according to claim 1 further comprising supplemental nozzles disposed behind said nozzle means for discharging air which is warmer than the ambient air but not as warm as said hot gas.

3. A device according to claim 2 wherein at least some of the supplemental nozzles are provided with heat exchanger means, second intake means drawing air at dynamic pressure at the bow of the ship, means to pass said air from said intake means through said heat exchanger means thereby slightly heating said air prior to exhausting it from the nozzles.

4. A device according to claim 1 wherein said device is mounted on a mobile chassis whereby said device may be stowed below decks during good weather.

References Cited by the Examiner

UNITED STATES PATENTS 2,522,667   9/50   De Land _____ 244—114

FOREIGN PATENTS 868,342   5/61   Great Britain.

FERGUS S. MIDDLETON, *Primary Examiner.*

ANDREW H. FARRELL, MILTON BUCHLER,
*Examiners.*